Jan. 5, 1937.　　　　F. E. WOOLEY　　　　2,067,070
HEATING SYSTEM
Filed Jan. 13, 1934　　　2 Sheets-Sheet 1
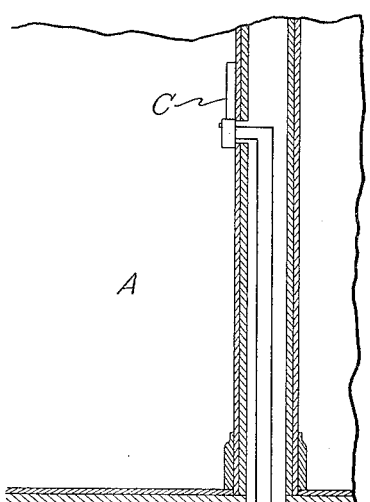
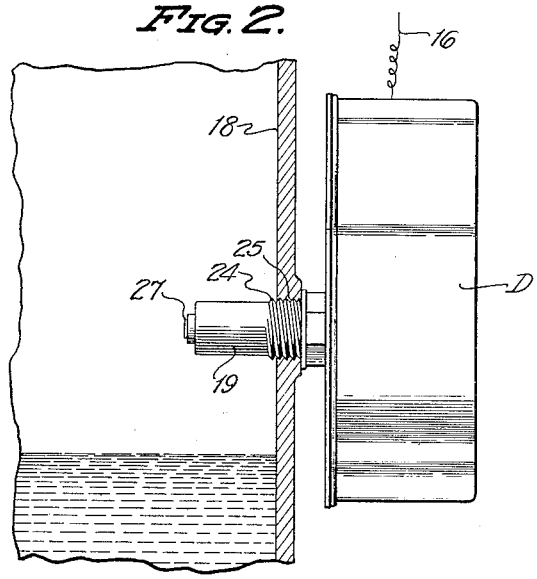
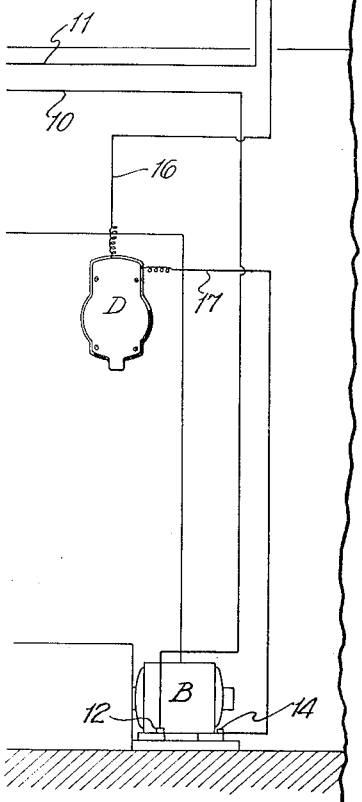
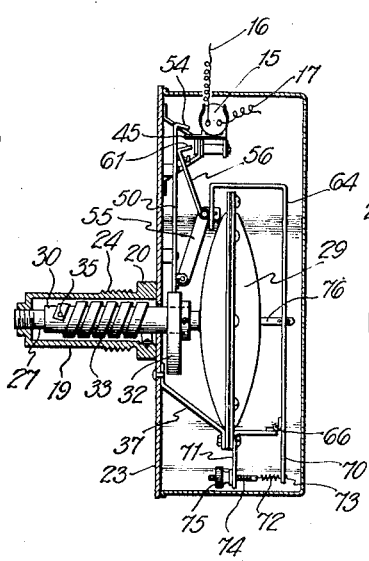
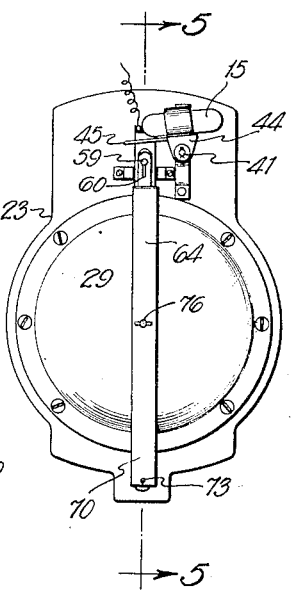
INVENTOR
FREDERICK E. WOOLEY.
BY
Ely & Pattison
ATTORNEYS Jan. 5, 1937. F. E. WOOLEY 2,067,070
HEATING SYSTEM
Filed Jan. 13, 1934 2 Sheets-Sheet 2
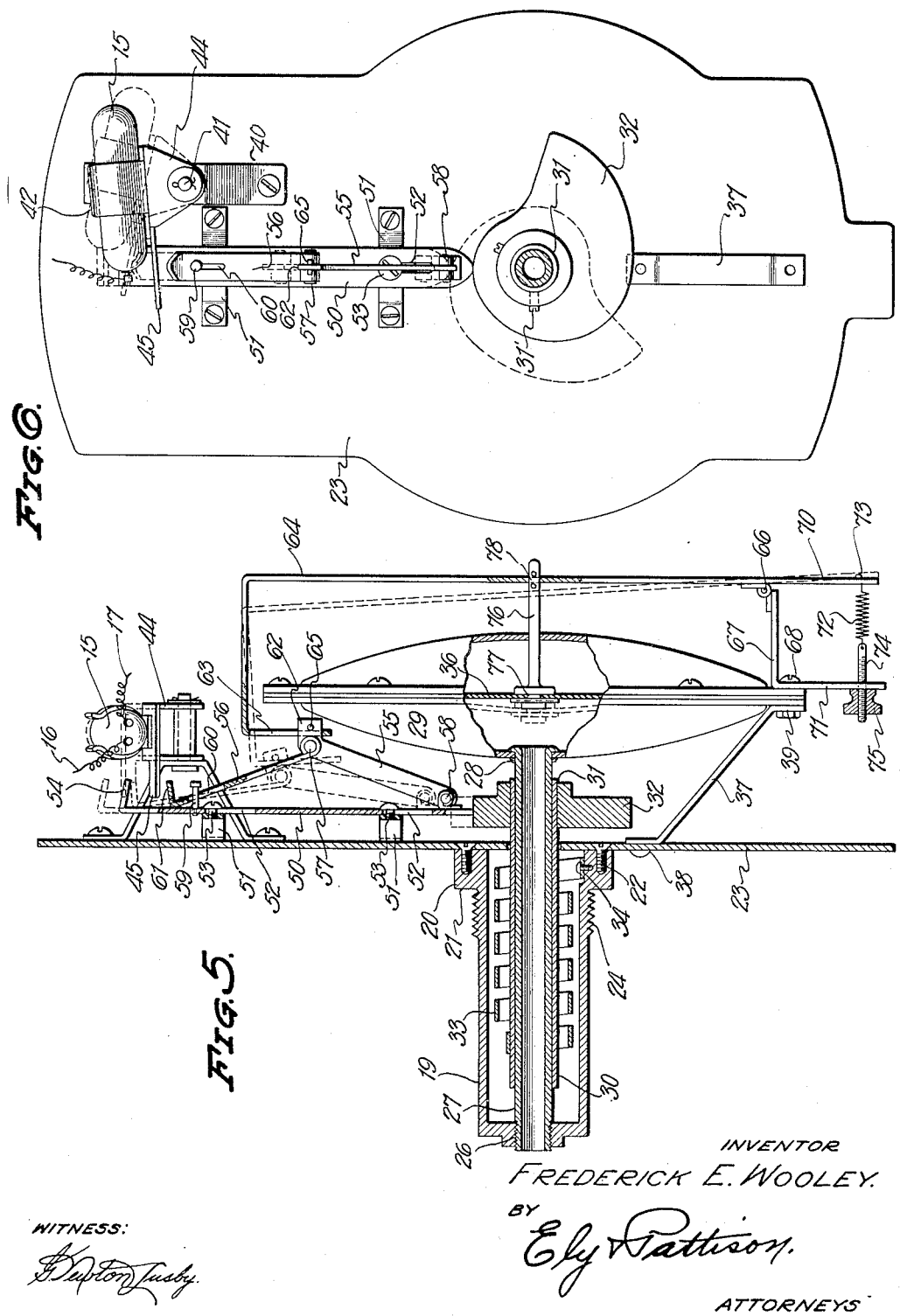
INVENTOR
FREDERICK E. WOOLEY.
BY
Ely Pattison.
ATTORNEYS
WITNESS:

Patented Jan. 5, 1937

2,067,070

UNITED STATES PATENT OFFICE 2,067,070

HEATING SYSTEM

Frederick E. Wooley, Manasquan, N. J.

Application January 13, 1934, Serial No. 706,469

7 Claims. (Cl. 237—9)

The present invention relates to improvements in heating systems, and more particularly it pertains to a novel method of operation of heating systems and a novel control mechanism for automatically effecting the novel method of operation.

In the automatic operation of heating systems as generally carried out, whether the heat transfer medium be air, water or steam, the source of heat is subjected to periods of forced firing in order to bring the heat transfer medium to the required temperature to produce the desired result. These forced firing periods are generally controlled, or at least determined by a temperature responsive device located in the compartment or area, such as a room, in which a predetermined temperature range is desired. In automatic systems as above described, the forced firing periods are generally intensive, which operation results in unnecessary consumption of fuel and does not result in even temperature condition where desired.

These disadvantages have been obviated to a considerable extent in steam heating systems by operation of the system on the so-called vacuum or sub-atmospheric pressure principle. Vacuum systems, however, require for their successful operation, special apparatus to maintain the necessary sub-atmospheric pressure in the system, the cost of installation and operation of which renders such systems more or less impractical, particularly in small plants such as household heating plants.

One object of the present invention is to improve the construction and mode of operation of heating systems in particular, and to operate heating systems in a novel manner which will more nearly approach the state of perfection desired in a highly efficient and economic manner.

A feature of the invention resides in a novel method of operation whereby, except for slight changes in equipment, an ordinary steam heating plant, designed and installed to operate upon the so-called pressure principle, may be operated upon the vacuum or sub-atmospheric principle and this is true regardless of the size of the plant.

Another feature of the invention resides in a novel control mechanism whereby the operation of a steam heating plant designed and installed to operate upon the so-called pressure system, will upon the attainment of certain conditions within the system, automatically convert the system from operation upon the so-called pressure principle to operation upon the so-called vacuum or sub-atmospheric pressure principle and maintain this last mentioned principle of operation over an extended period of time.

Still another feature of the invention resides in a novel control mechanism which functions automatically to restore the system to operation upon the so-called vacuum or sub-atmospheric pressure principle should it from any cause, revert to operation upon the so-called pressure principle.

Other features of the invention relate to certain novel and improved constructions, arrangements and combinations of parts hereinafter described and particularly pointed out in the claims, the advantages of which will be readily understood and appreciated by those skilled in the art.

The invention will be clearly understood from the accompanying drawings illustrating the invention in its preferred form and the following detailed description of the constructions therein shown.

In the drawings,

Figure 1 is a view partly in elevation and partly in section and showing a portion of a room, compartment or area to be heated, and diagrammatically, the installation of the several elements of the control apparatus of the system, Figure 2 is a detail sectional view illustrating the installation of a portion of the control mechanism upon the boiler when the invention is applied to a steam heating plant, Figure 3 is a vertical sectional view on a slightly reduced scale, of that element of the control mechanism illustrated in Figure 2, Figure 4 is a view at right angles to Figure 3, with the cover removed, Figure 5 is a vertical sectional view on an enlarged scale, taken on the line 5—5 of Figure 4, and;

Figure 6 is a view in elevation taken at right angles to Figure 5, with certain of the parts removed.

Referring to the drawings, and particularly to Figure 1, the reference character A, designates a room, compartment or area in which a suitable temperature or temperature range is to be maintained. The reference character B designates a suitable forced firing element by means of which a suitable forced firing of a source of heat may be obtained. This forced firing element may be the electric motor of a fuel burner, the electric motor of a blower, a gas valve for controlling the fuel supply to a gas burner or any other device or apparatus which when operating, will produce a forced firing condition of the source of heat.

The reference numerals 10 and 11, designate the two legs of a suitable power circuit for supplying power to the several electrical elements or instruments of the control apparatus and as illustrated in Figure 1, the leg 10 of this circuit is connected to one terminal 12, of the forced firing element B. The leg 11, of the power circuit includes a temperature responsive switch of any desired type, conventionally illustrated at C, in Figure 1, and is connected to the terminal 14, of the forced firing element B. The reference character D, designates a control element which will be hereinafter more specifically described, and this control element includes an electric switch 15, see Figures 3 and 4, which switch is preferably of the so-called mercury type. The switch 15, is connected to the leg 11, of the power circuit by conductors 16 and 17. By this construction and arrangement of parts, the control device, by operation of the switch 15, may operate to open and close the power circuit independently of the temperature responsive switch C it being understood of course that the temperature responsive switch C will remain closed until such time as the temperature in the compartment A has reached the desired height.

In this application, the invention is illustrated as embodied in a steam heating system, that is to say, in a system wherein steam is the heat transfer medium and as illustrated in Figure 2, of the drawings, the control element D, which in such installations is a combined temperature and pressure responsive device, is attached to the steam boiler 18, of such a system in such a manner that it will be affected by conditions existing in the steam space or the space above the water level as shown in said Figure 2.

19 designates a tubular housing having an enlarged end portion 20, to provide a bearing or shoulder 21, for engagement with the boiler wall and also to provide suitable material for the reception of screws or the like 22, which latter serve to secure a plate 23, in position. This plate 23, serves to support certain portions of the control element D, as will be hereinafter more specifically described. For attachment to the boiler 18, the tubular housing 19, may be threaded as at 24, for threaded engagement with an internally threaded opening 25, in the boiler 18. Threaded or otherwise secured in the tubular housing 19, as at 26, there is a tubular member 27, which extends through the plate 23, and has its other end 28, passing through one of the walls of the housing 29, of a pressure responsive device, thereby providing communication between the steam space of the boiler 18, and the interior of the housing 29, of the pressure responsive device.

Revolubly and slidably mounted upon this tubular member 27, there is a sleeve 30, the end 31, of which projects through the plate 23. Carried by the projecting end 31, of the sleeve 30, and adjustably secured thereon by a set screw 31', there is a cam 32, so constructed and arranged that as the sleeve 30, turns upon the tubular member 27, the cam will be rotated. The sleeve 30, is rotated upon the tubular member 17, by a thermal element 33, which is herein illustrated as a spirally wound strip of metal having one end secured to the tubular housing 19, as at 34, the other end of the thermal element being connected to the sleeve 30, as at 35. This thermal element surrounds the sleeve 30, and it will be apparent that as the said thermal element expands and contracts under varying temperature conditions, the sleeve 30, will be rotated upon the tubular member 27, thereby rotating the cam 32.

Mounted within the housing 29, of the pressure responsive device, there is a diaphragm 36, and this pressure responsive device is supported in operative position by the tubular member 27, and a bracket 37, connected to the plate 23, as at 38, and to the housing 29, of the pressure responsive device as at 39.

The reference character 40, designates a bracket carried by the plate 23, and the mercury switch 15, heretofore mentioned, is pivotally mounted on this bracket 40 at 41, the switch being removably mounted between spring clips 42, which extend from a rocking carriage 44, pivotally mounted as at 41, as heretofore mentioned. This rocking carriage 44, has an extended arm 45, for engagement by suitable means to effect a rocking of the carriage 44, about its pivotal point 41, to effect operation of the mercury switch 15.

In the present embodiment of the invention, the means which operates to rock the carriage 44, consists in part of a tripping member 50, slidably mounted upon the plate 23, and arranged for operation in one direction by the cam 32, heretofore mentioned and in the other direction by gravity. Although it is not herein illustrated, a spring may be attached at one end to the tripping member 50, and at its opposite end to the plate 23, to operate the tripping member in the direction opposite to that in which it is positively operated by the cam 32.

One convenient manner of mounting the tripping member 50, for sliding or reciprocating movement upon the plate 23, consists of studs 51, suitably secured to the plate 23, and the tripping member 50, is provided with slots 52, which receive headed screws or the like 53, which project from the studs 51.

The lower end of the tripping member 50, rides upon the cam 32, and the cam 32, is so designed that as it rotates in a clockwise direction, the tripping member 50, will be elevated and as it rotates in a counter clockwise direction, the tripping member 50, will be free to move downwardly under the influence of gravity or by a spring as described. The upper end of the tripping member 50, is provided with an angular extension 54, which, when the tripping member 50, descends, is adapted to engage the extended arm 45, of the carriage 43, thereby to rock the mercury switch 15, to the left in Figure 6, to complete the circuit through the conductors 16, and 17.

Means is provided to rock the switch 15, to the right in Figure 6, when the tripping member 50, is elevated by rotation of the cam 32, in a clockwise direction and as herein illustrated, this means consists of a toggle mechanism carried by the tripping member 50. This mechanism consists of two levers 55, and 56, which are pivotally connected together as at 57. The lever 55, of the toggle mechanism is pivotally connected to the tripping member 50, as at 58, the lever 56, of the toggle mechanism being slidably connected to the tripping member 50, by a pin 59, carried by said tripping member 50, and projecting through a slot 60, in the lever 56. The free end of the lever 56, is provided with an angular extension 61, which when the tripping member 50, is moved upwardly, will engage beneath the extended arm 45, of the carriage 44, and rock the mercury switch 15, to the right in Figure 6, to interrupt or open the circuit through the conductors 16, and 17.

As best illustrated in Figure 5, of the drawings, the lever 55, of the toggle mechanism has an extension 62, which projects through a slot 63, in an arm 64, and which is held in position by a pin 65. By this construction, the toggle mechanism is slidably connected to the arm 64. The arm 64, is pivotally connected as at 66, to a bracket 67, carried by a housing 29, and secured thereto as at 68. The arm 64, is extended beyond its pivotal point 66, as at 70, and the bracket 67, has an extension 71, the arm extension 70, and the bracket extension 71, being parallel to each other. A spring 72, is connected at one end to the arm extension 70, as at 73, and at its other end to a threaded bolt 74, which passes through an opening in the bracket extension 71. This threaded bolt 74, receives a nut 75, thereon which nut engages behind the bracket extension 71, and serves to place the spring 72, under tension to provide for adjustment of the operating range of the control element D. The arm 64, is connected directly with the diaphragm 36, by a rod 76, which is connected to the diaphragm at 77, and to the arm as at 78, in such a manner that upon movement of the diaphragm 36, the arm 64 will be rocked about its pivotal point 66, against the tension of the spring 72, when rocked to the left in Figure 5, and aided in its rocking movement to the right in said figure, by the spring 72.

I will now proceed to describe the manner in which the mechanism functions to operate and control a steam heating plant in connection with which it is herein illustrated.

We will assume for the sake of illustration that the entire system is cold and that the temperature of the compartment A, is below that desired, it being understood that the power line comprised of the conductors 10, and 11, has a switch which is open to interrupt or open the circuit thereof.

Under the above conditions, although the power line is open by the main switch not herein shown, it is closed both at the temperature responsive device C, in the compartment A, and at the mercury switch 15. If now, the main switch of the power line be closed, the circuit to the forced firing element B, will be closed, and this device will begin to operate to effect a forced firing of the source of heat, it being understood, of course, that the source of heat has been ignited.

The forced firing period continues until a sufficient steam pressure is generated within the boiler to purge the entire system of air which may have accumulated during the cold period at which time, the circuit of the forced firing element B, is interrupted and the initial forced firing period terminated.

The interruption of the circuit of the forced firing element B, is automatic, and is accomplished in the following manner.

During the initial forced firing period and in consequence of the generation of steam in the boiler, the temperature in the steam space above the water level within the boiler will rise. This rise of temperature in the steam space of the boiler will effect an operation of the thermal element 33, causing it to drive the sleeve 30, and the cam 32, in a clockwise direction in Figure 6. As before stated, clockwise movement of the cam 32, raises the tripping member 50, and when it has been raised sufficiently, the angular extension 61, of the lever 56, will engage the extended arm 45, of the carriage 44, and tilt the mercury switch 15, to the right in Figure 6, thus breaking the circuit to the forced firing element B, in the conductors 16, and 17.

The forced firing element having ceased to operate, the pressure in the system which was generated during the initial forced firing period falls and finally attains a point where sub-atmospheric pressure or a partial vacuum exists throughout the system, it being understood, of course, that the radiators will be equipped with with relief valves of the type which will prevent entrance of air to the system as the pressure falls.

As the pressure in the system reaches a predetermined point below atmosphere, which point may be determined by adjustment of the tension of the spring 72, the partial vacuum present in the system which has communication with the interior of the housing 29, through the tubular member 27, acts upon the diaphragm 36, and moves it to the dotted line position in which it is illustrated in Figure 5. As the diaphragm 36, moves to this dotted line position, through the medium of the rod 76, the arm 64, will be rocked about its pivotal point 66, to the position in which it is shown in dotted lines in Figure 5.

Movement of the arm 64, to the dotted line position acts to straighten out the toggle mechanism as illustrated in dotted lines in Figure 5, which moves the angular extension 61, of the lever 56, in closer proximity to the extended arm 45, of the carriage 44, so that the next movement of the tripping member 50, will not have to be as great to trip the mercury switch as was the case with the initial movement thereof before the sub-atmospheric pressure condition was established in the system and it will be evident that this is true of every tripping operation of the tripping member 50, so long as a sub-atmospheric pressure condition exists in the system.

Inasmuch as the initial forced firing period has now been terminated and a sub-atmospheric pressure condition established in the system, the temperature in the system, which of course includes the steam space of the boiler, begins to fall. This falling temperature acts upon the thermal element 33, in such a manner as to drive the cam 32, in the anti-clockwise direction in Figure 6, whereupon the tripping member 50, will follow the cam 32, and in its movement, will engage the extended arm 45, of the carriage 44, rock the mercury switch 15, to the left in Figure 5, and complete the circuit to the forced firing element B, through the conductors 16, and 17, whereupon another forced firing period is started. This will not, of course, be true if during the previous forced firing periods the temperature of the compartment A had been raised to a point where the temperature responsive device C, would operate its switch to open the circuit to the forced firing element B. This forced firing period will, however, be of shorter duration than the initial forced firing period since it will be terminated at a lower temperature in the steam space of the boiler than was required to terminate the initial forced firing period. This is so because of the fact that due to the sub-atmospheric pressure condition which exists in the system, the angular extension 61, of the lever 56, is in closer proximity to the extended arm 45, of the carriage 44, and the movement of the tripping member 50, necessary to effect a tripping of the mercury switch 15, is not as great as when the sub-atmospheric pressure condition does not exist in system. Therefore, upon a lesser rise of temperature in the steam space of the boiler, the cam will be moved sufficiently to effect a tripping of the mercury switch 15, and interrupt the circuit to the forced firing element B, and terminating the second forced firing period. Upon fall of temperature within the system, the above operation is repeated and the system operates automatically upon the sub-atmospheric pressure principle, to maintain the desired temperature in the compartment A, it being understood that the system is also under control of the temperature responsive device C and does not function as described, except when the temperature in the compartment A is below that desired.

From the foregoing, it will be apparent that in so long as the sub-atmospheric pressure condition exists within the system, all forced firing periods subsequent to the initial forced firing period will be of shorter duration than the initial forced firing period and the system will operate on the so-called vacuum principle as distinguished from the pressure principle of operation, thus appreciably reducing the cost of operation.

If, from any reason, such as a leak or leaks in the system, which after operation upon the vacuum principle over an extended period, the sub-atmospheric pressure condition were to become destroyed, the diaphragm 36, the arm 64, and the toggle mechanism would return to the positions in which they are shown in full lines, retracting the angular extension 61, of the lever 56, from its position in relatively close proximity to the extended arm 45, in which position, the next forced firing period would be of such duration as would generate sufficient pressure to again purge the system of air and re-establish the sub-atmospheric pressure condition within the system after which the system would again operate upon the vacuum principle so long as the sub-atmospheric pressure condition within the system continues to exist.

It will therefore be apparent that the system, while operating initially upon the pressure principle, is automatically converted to operation upon the so-called vacuum system and that should the sub-atmospheric pressure condition cease to exist, it is automatically restored by the next forced firing period.

It will be obvious that the temperature at which the tripping device 50, will effect an operation of the mercury switch 15, may be varied, merely by adjustment of the cam 32, circumferentially of the sleeve 30, which may be easily accomplished by means of the set screw 31'. For example, if the cam be adjusted in a clockwise direction in Figure 6, the high portion thereof will be initially positioned in relatively close proximity to the lower end of the tripping member 50, and the distance of travel of the cam to effect an operation of the tripping member 50, will necessarily be shorter and consequently the operation would be effected at a lower temperature in the steam space of the boiler. The reverse action would necessarily result upon adjustment of the cam in an anti-clockwise direction in Figure 6.

From the foregoing, it will be apparent that the present invention provides for the automatic operation of a pressure steam heating system upon the more economical vacuum principle without the necessity of expensive apparatus generally employed in the so-called vacuum operation of steam heating systems.

While the invention has been herein illustrated in its preferred form, it is to be understood that it is not limited to the specific construction and apparatus herein shown and described and that it may be operated by apparatus of other construction than that herein shown.

Having thus described the invention, what is claimed as new and what it is desired to secure by Letters Patent of the United States, is:

1. In a steam heating system, a heat transfer medium, a source of heat, means responsive to variations in conditions of an area to be heated for effecting forced firing of said source of heat when the temperature of said area falls below a predetermined value, means responsive to temperatures of the heat transfer medium for terminating the forced firing of the source of heat when the temperature of said medium rises to a predetermined amount, the pressure corresponding thereto being sufficient to purge the system of air and for allowing subsequent forced firing of the source of heat, and pressure actuated means responsive to pressures within the system for varying the temperature at which said last named means acts in accordance with variations in said pressure.

2. In a steam heating system, a heat transfer medium, a source of heat, means responsive to variations in temperature of an area to be heated for effecting forced firing of said source of heat when the temperature of said area falls below a predetermined value, means responsive to temperatures of the heat transfer medium for terminating the forced firing of the source of heat when the temperature of said medium rises a predetermined amount the pressure corresponding thereto being sufficient to purge the system of air; and for allowing subsequent forced firing of the source of heat, and separate means responsive to conditions in the system for varying the temperature at which said last named means acts in accordance with variations in said pressure.

3. In combination with a steam heating system, control means including an electric circuit for controlling the steam supply, a switch in said circuit for opening and closing the circuit, means for operating said switch to effect opening and closing of the electric circuit, means responsive to variations in temperature in the system for moving said switch operating means initially through a predetermined distance to effect an initial operation of the switch, and separate means responsive to variations in pressure in the system for rendering said switch operating means operative upon decrease in pressure to effect subsequent operations of the switch upon movements of lesser distance than the said initial movement of said switch operating means.

4. A combined temperature and pressure operated control device comprising in combination, a tripping device including spaced apart tripping members movable in opposite directions to effect their respective tripping actions, one of said members being movable relative to the other, temperature responsive means for operating said tripping members as a unit, and pressure responsive means for determining the magnitude of movement of said movable tripping member to effect a tripping operation.

5. A combined temperature and pressure operated control device comprising in combination, a reciprocating tripping device including spaced apart tripping members movable in opposite directions to effect their respective tripping actions, one of said members being movable relative to the other, said tripping device having a maximum degree of movement to effect a tripping operation, temperature responsive means for moving said tripping members as a unit in one direction, and pressure responsive means for rendering said movable tripping member operative to effect a tripping operation when moved a distance less than its maximum degree of movement.

6. A combined temperature and pressure operated control device comprising in combination, a reciprocating tripping device, including spaced apart tripping members movable in opposite directions to effect their respective tripping actions, one of said members being movable relative to the other, a cam for moving said tripping members as a unit through a maximum degree of movement to effect a tripping operation, temperature responsive means for operating said cam, and pressure responsive means for rendering said movable tripping member operative to effect a tripping operation of the tripping member, when the latter is moved a distance less than its maximum degree of movement.

7. A steam heating system and control therefor comprising in combination, a steam boiler, a source of heat for firing said boiler, an electrically operated means including an electric circuit and a switch for producing a forced firing of the source of heat of said boiler, and means for automatically operating said switch, said switch operating means comprising a tripping device including spaced apart tripping members movable in opposite directions to effect their respective tripping actions, one of said members being movable relative to the other, a cam for operating said tripping members as a unit in one direction through a maximum amount of movement to effect a tripping operation thereby, temperature responsive means actuated by variations in temperature in the heating system for actuating said cam, and means responsive to variations in pressure in the heating system for so adjusting said movable tripping member as to render it operative to effect a tripping operation upon a movement thereof less than its maximum.

FREDERICK E. WOOLEY.